(12) United States Patent
Yuasa

(10) Patent No.: US 11,514,601 B2
(45) Date of Patent: Nov. 29, 2022

(54) WORKING VEHICLE AND TRAVELING MANAGEMENT SYSTEM FOR THE WORKING VEHICLE

(71) Applicant: KUBOTA CORPORATION, Osaka (JP)

(72) Inventor: Junichi Yuasa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 76 days.

(21) Appl. No.: 17/116,026

(22) Filed: Dec. 9, 2020

(65) Prior Publication Data

US 2021/0201528 A1 Jul. 1, 2021

(30) Foreign Application Priority Data

Dec. 27, 2019 (JP) .............................. JP2019-239899

(51) Int. Cl.
*G06T 7/73* (2017.01)
*A01B 76/00* (2006.01)

(52) U.S. Cl.
CPC ............... *G06T 7/73* (2017.01); *A01B 76/00* (2013.01); *G06T 2207/30204* (2013.01); *G06T 2207/30252* (2013.01)

(58) Field of Classification Search
CPC ....... G06T 3/0068; G06T 3/0075; G06T 7/30; G06T 7/38; G06T 7/73; G06T 7/74; G06T 7/80; G06T 7/97; G06T 2207/30204; G06T 2207/30248; G06T 2207/30252; G06K 9/00; G06V 20/56; G06V 20/58; G06V 20/582; G06V 20/584; G06V 20/586; G06V 20/588; G06V 2201/08; G05D 1/0234; G05D 1/0246; G05D 1/0253; A01B 69/003
See application file for complete search history.

(56) References Cited

U.S. PATENT DOCUMENTS

| | | | |
|---|---|---|---|
| 4,555,725 A * | 11/1985 | Geiersbach et al. ........................ | G05D 1/0246 348/120 |
| 2011/0050903 A1 | 3/2011 | Vorobiev | |
| 2018/0027179 A1 | 1/2018 | Matsuzaki et al. | |
| 2018/0040129 A1 * | 2/2018 | Dotzler .................. | B60R 11/04 |
| 2018/0121742 A1 * | 5/2018 | Son et al. ............ | G06V 10/147 |
| 2018/0202804 A1 | 7/2018 | Dumble et al. | |
| 2021/0019904 A1 * | 1/2021 | Selensky et al. .... | B62D 15/023 |
| 2021/0027490 A1 * | 1/2021 | Taiana et al. ......... | B60D 1/245 |

FOREIGN PATENT DOCUMENTS

| | | |
|---|---|---|
| DE | 10 2015 109 799 A1 | 12/2016 |
| EP | 3 300 558 A1 | 4/2018 |
| JP | 2018-014554 A | 1/2018 |
| JP | 2018-061471 A | 4/2018 |

* cited by examiner

*Primary Examiner* — Andrew W Johns
(74) *Attorney, Agent, or Firm* — Keating and Bennett, LLP

(57) ABSTRACT

A working vehicle includes a traveling body including a coupler to which a working device is connected, a marker provided to the working device, a marker detector provided to the traveling body to detect the marker, and a status calculator to calculate a status of the working device based on a detection data detected by the marker detector.

18 Claims, 14 Drawing Sheets

WORKING VEHICLE AND TRAVELING MANAGEMENT SYSTEM FOR THE WORKING VEHICLE

CROSS REFERENCE TO RELATED APPLICATIONS

This application claims the benefit of priority to Japanese Patent Application No. 2019-239899 filed on Dec. 27, 2019. The entire contents of this application are hereby incorporated herein by reference.

BACKGROUND OF THE INVENTION

1. Field of the Invention

The present invention relates to a working vehicle such as a tractor and to a traveling management system for the working vehicle.

2. Description of the Related Art

Japanese Unexamined Patent Publication No. 2018-61471 discloses a conventional technique for attaching a wireless tag to a working device connected to a tractor or other working vehicle. Japanese Unexamined Patent Publication No. 2018-61471 includes a working portion, a frame which supports the working portion and can be connected to a vehicle body, and a wireless tag attached to the working portion or the frame and including a storage portion which stores at least identification information and a communicator portion which transmits the identification information.

The technique disclosed in Japanese Unexamined Patent Publication No. 2018-14554 is also known as a technique for mounting a camera on a working vehicle of a tractor. The technique disclosed in Japanese Unexamined Patent Publication No. 2018-14554 includes a plurality of cameras for photographing a periphery of a vehicle body, a group of sensors for detecting a working and traveling status, an interested area determiner portion for determining an interested area based on detection signals from the group of sensors for detecting a working and traveling status, a prioritized display image determiner portion for determining as a prioritized display image an image taken by one of the cameras that has an interested area in its field of view, an around view generator portion generates an around view around a vehicle body by synthesizing images taken by the cameras in various viewpoints, a monitor screen generator portion that generates a monitor display screen divided into a first display area that displays the overlooking image and a second display area that displays the prioritized display image, and a monitor to display the monitor display screen.

SUMMARY OF THE INVENTION

A working vehicle includes a traveling body including a coupler to which a working device is connected, a marker provided to the working device, a marker detector provided to the traveling body to detect the marker, and a status calculator to calculate a status of the working device based on a detection data detected by the marker detector.

A traveling management system for a working vehicle, includes a marker provided to a working device connected to a traveling body, a marker detector provided to the traveling body to detect the marker, and a status calculator to calculate a status of the working device based on detection data detected by the market detector.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
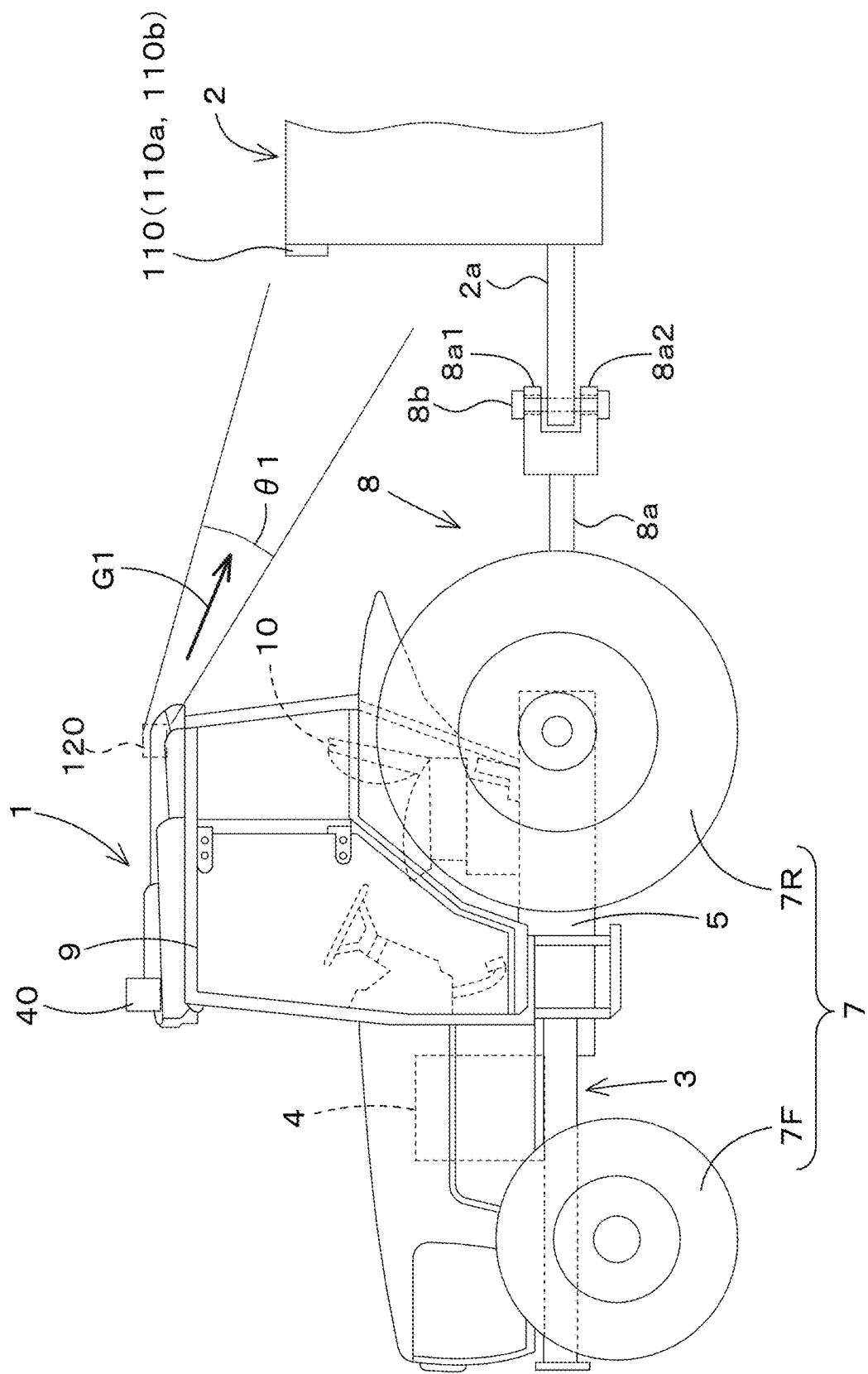
FIG. 1 is a side whole view of a tractor.

The preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

FIG. 1 shows the working device 2 coupled to the working vehicle 1.

First, a tractor that is one of the working vehicles will be explained.

The tractor 1 is provided with a traveling machine body 3 with a traveling device 7, a prime mover 4, and a speed-shifter device (transmission) 5. The traveling device 7 is a device having a front wheel 7F and a rear wheel 7R. The front wheels 7F may be tire-type or crawler-type. The rear wheels 7R may also be tire or crawler type. The prime mover 4 is a diesel engine, an electric motor, and the like.

The speed-shifter device 5 is capable of switching the propulsion of the traveling device 7 by shifting gears, and of switching the traveling device 7 between the forward traveling or the backward traveling. A cabin 9 is provided in the traveling machine body 3, and an operator seat 10 is provided in the cabin 9.

At the rear portion of the traveling machine body 3, a coupler portion 8 is provided to connect the working device 2. The coupler portion is a swinging drawbar that connects the working device 2 to the traveling machine body 3 and raises and lowers the working device 2, including a swinging drawbar, a three-point link mechanism, or the like, which does not raise or lower the working device 2. The working device 2 can be attached to and detached from the coupler portion 8. By connecting the working device 2 to the coupler portion 8, the working device 2 can be towed by the traveling machine body 3.

The working device 2 includes a trailer for transporting, a tiller for cultivating, a fertilizer spreader for spraying fertilizer, a transplanting device for planting seedlings, an irrigation device for irrigating, a pesticide sprayer for spraying pesticides, a seed spreader for spreading seeds, a mower device for mowing grasses and the like, a tedder for tedding grasses and the like, a raking device for collecting grasses and the like, a baler device for baling grass and other materials, a combined machine for multiple tasks, and the like. In this preferred embodiment, the description proceeds as the working device 2 is the trailer.

The working device 2 includes a coupling bar 2a, which is fixed to the frame of the working device 2 by bolts or other fasteners and is not pivotable in the width direction. The coupling bar 2a may be welded to the frame of the working device 2. An insertion hole 2c is located in the front end portion of the coupling bar 2a.

Figure 2:
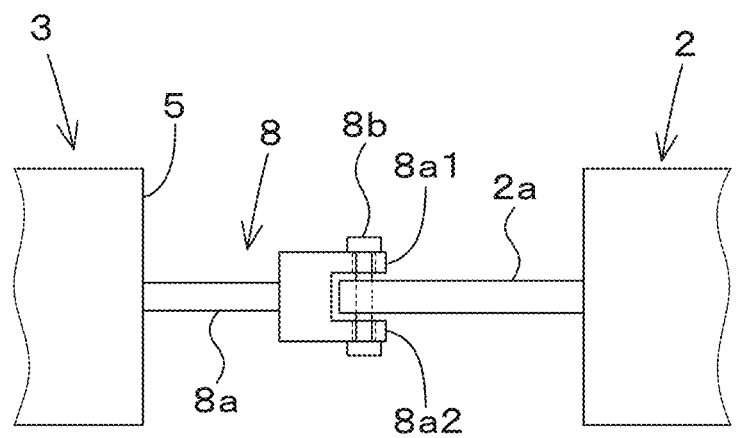
FIG. 2 is a view illustrating a coupler portion.
Figure 2:
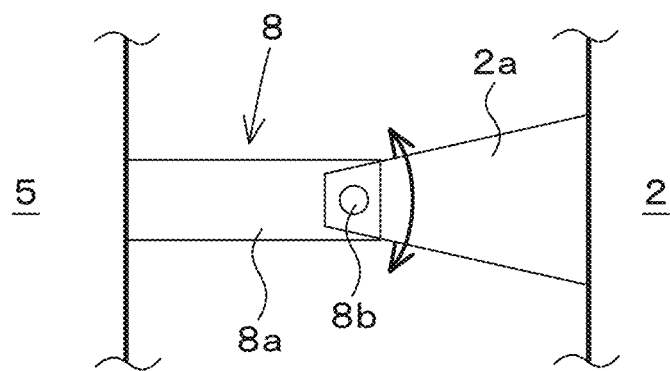

As shown in FIG. 2, the coupler portion 8 is, for example, a towing hitch and includes an extender body 8a extended rearwardly from the traveling machine body 3 and a pivoting pin 8b provided at the rear end portion of the extender body 8a. The front portion of the extender body 8a is fixed to the transmission case, differential case, and the like of the speed-shifter device 5 with bolts or other fasteners, and is not pivotable in the width direction.

The rear portion of the extender body 8a includes an upper wall 8a1 and a lower wall 8a2 separated from the upper wall 8a1, with a pivot pin 8b penetrating the upper wall 8a1 and the lower wall 8a2. By positioning the coupling bar 2a of the working device 2 between the upper wall 8a1 and the lower wall 8a2 and inserting the pivot pin 8b into the insertion hole in the coupling bar 2a, the working device 2 can be connected to the coupler portion 8.

Figure 3:
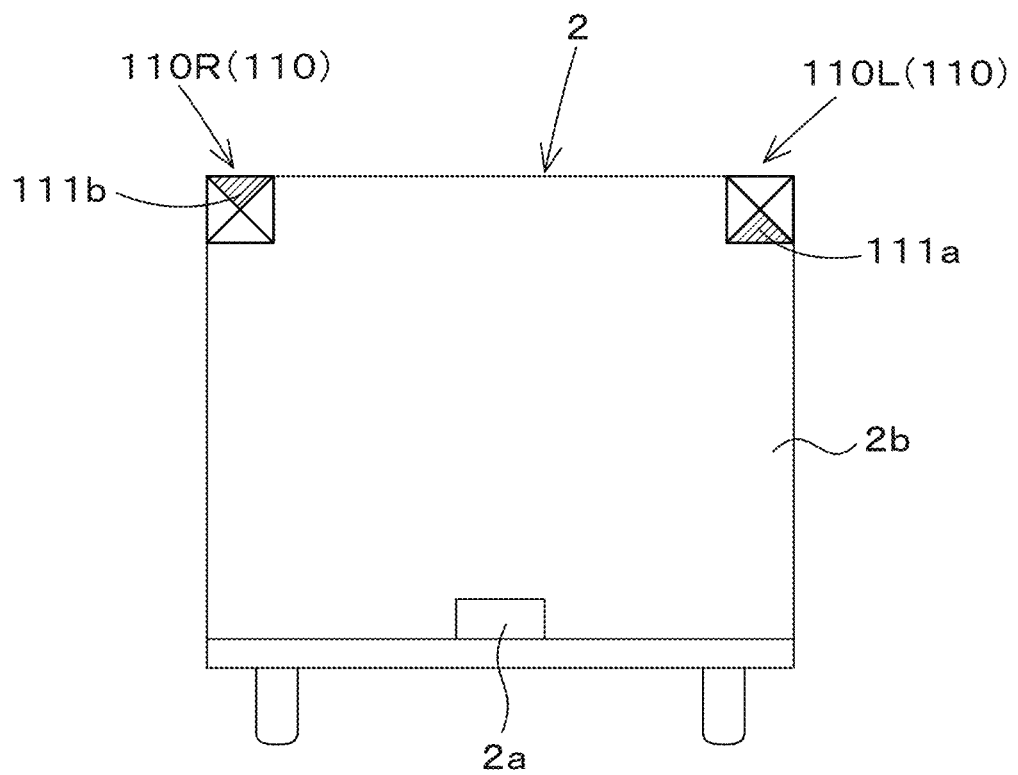
FIG. 3 is a view illustrating an attachment state of a marker member.

As shown in FIG. 3, the working device 2 is provided with a plurality of marker members 110. FIG. 3 shows a view of the working device 2 connected to the rear portion of the traveling machine body 3 from the rear side of the traveling machine body 3. The plurality of marker members 110 includes a first marker member 110L and a second marker member 110R.

The first marker member 110L is attached to the upper left-hand corner of frame 2b of working device 2. The second marker member 110R is mounted in the upper right-hand corner of the frame 2b of the working device 2. The attachment positions of the plurality of marker members 110 are not limited.

The first marker member 110L and the second marker member 110R are identifiable as different markers from each other and are colored with different colors 111a and 111b in the frames that define the markers.

Figure 4A:
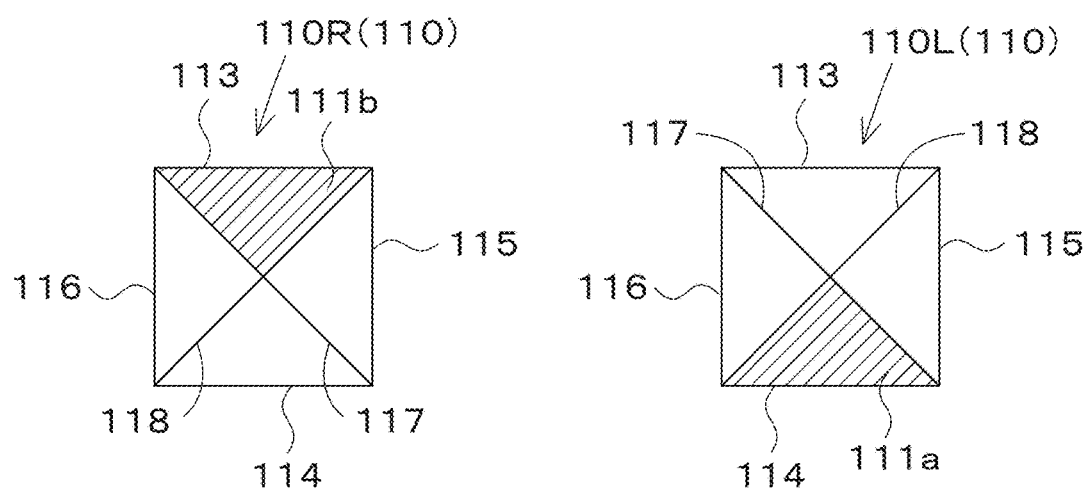
FIG. 4A is a view illustrating an example of a marker member.

As shown in FIG. 4A, the first marker member 110L and the second marker member 110R are rectangular (square) with four sides. The upper side 113 and the lower side 114, which define the respective boundaries (frames) of the first marker member 110L and the second marker member 110R, are parallel to the upper side 113 and the lower side 114, which are also parallel to the right side 115 and the left side 116, and the upper side 113 and the lower side 114 and the right side 115 and the left side 116 are perpendicular to each other.

At the first marker member 110L and the second marker member 110R, there are intersecting lines 117 and 118 for recognition as markers.

Figure 4B:
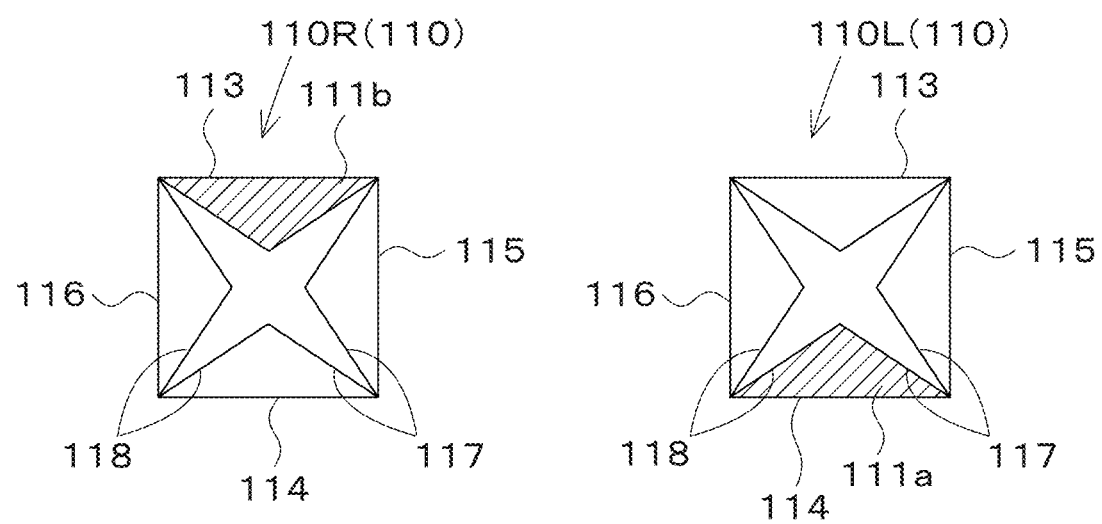
FIG. 4B is a view illustrating an example of a marker member different from FIG. 4A.

The marker member 110 in FIG. 4A is an example. For example, as shown in FIG. 4B, a plurality of lines 117 and 118 may be within the frame of the first marker member 110L and the second marker member 110R, as shown in FIG. 4B. In the first marker member 110L and the second marker member 110R in FIG. 4B, the colors 111a and 111b are also colored to identify the markers individually.

Figure 4C:
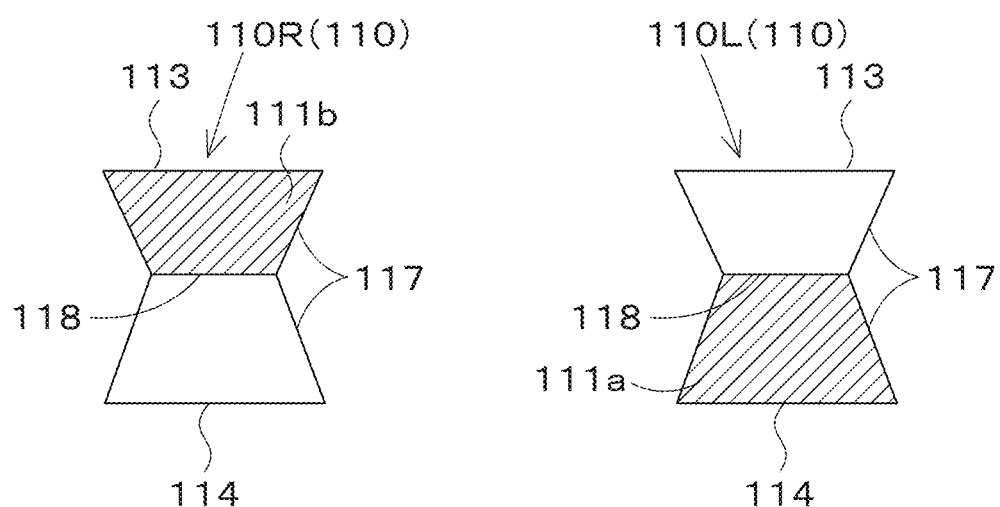
FIG. 4C is a view illustrating an example of a marker member different from FIG. 4B.
Figure 5:
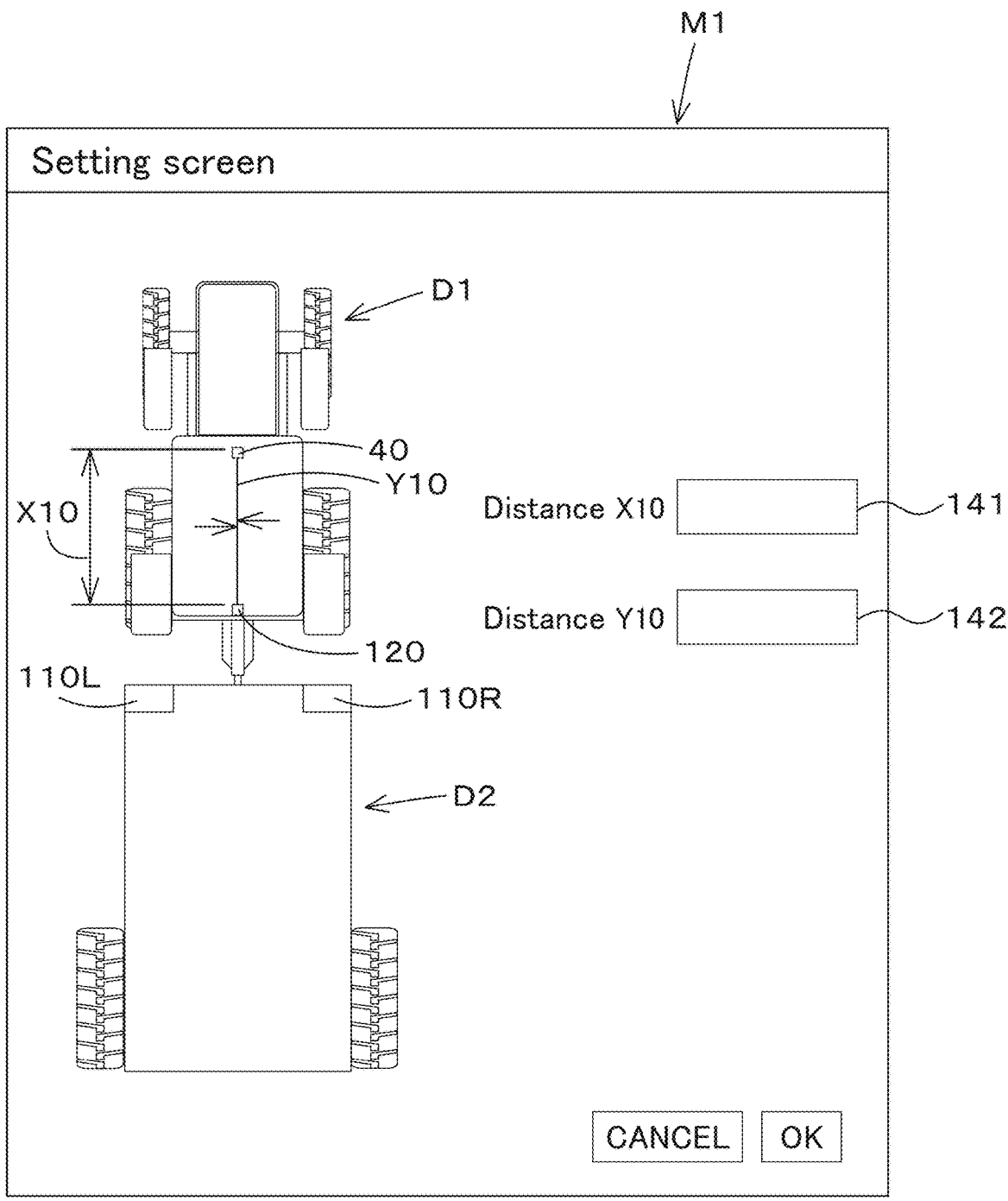
FIG. 5 is a view illustrating an example of a setting screen.

The first marker member 110L and the second marker member 110R shown in FIG. 4C include an upper side 113 and a lower side 114, with lines 117 and 118 located in the frame and colored with colors 111a and 111b.

Figure 6:
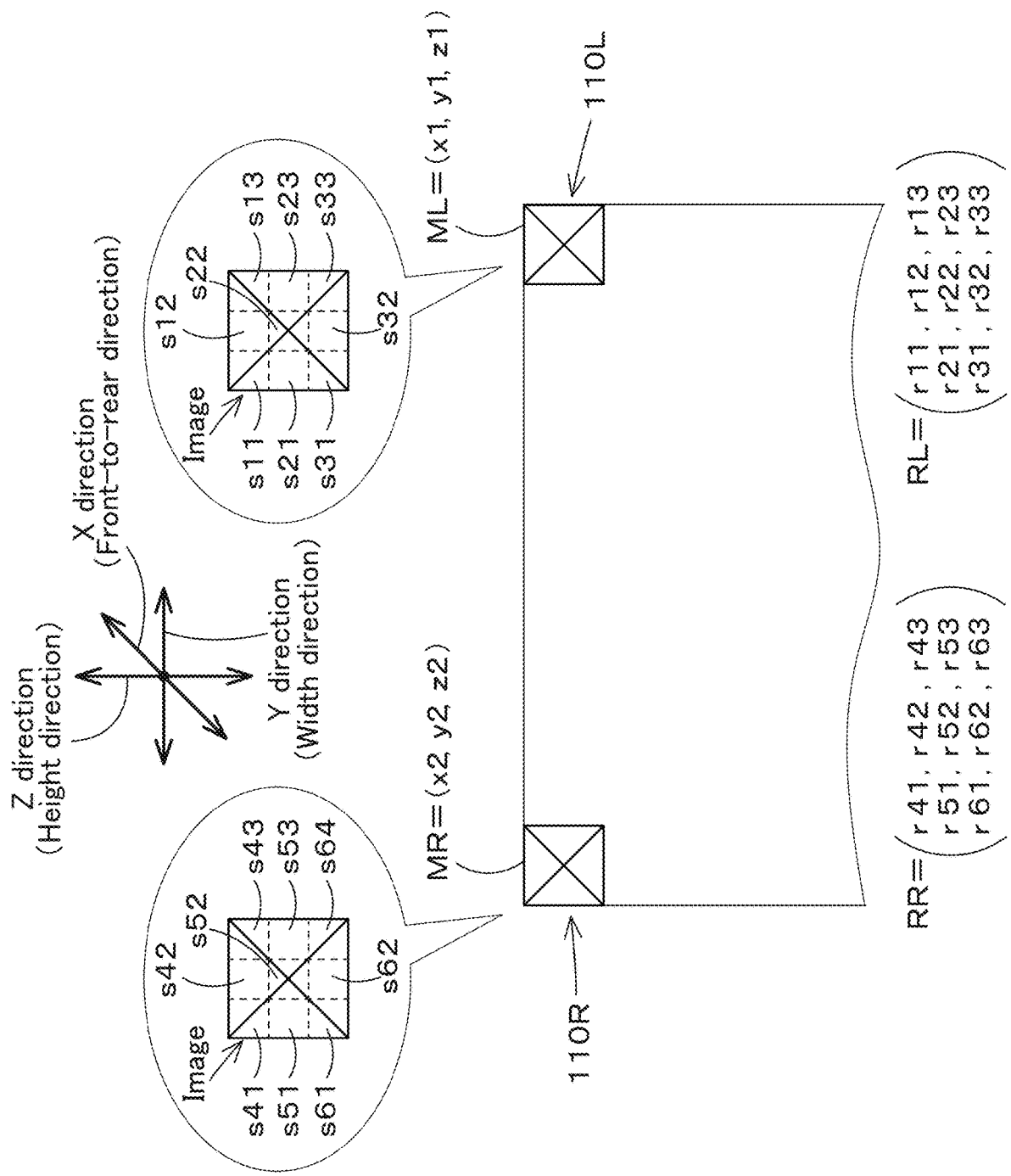
FIG. 6 is a view illustrating a position and posture of a marker.

As shown in FIG. 1 and FIG. 6, a marker detector device 120 is provided at the rear portion of the tractor 1 to detect a plurality of marker members 110. The marker detector device 120 is a CCD camera, a CMOS camera, and an infrared camera. The imaging direction X1 of the marker detector device 120 is directed to the plurality of marker members 110.

In the marker detector device 120, the position of the marker detector device 120 is set within the angle of view θ1 (imaging range). The marker detector device 120 is located, for example, on top of the cabin 9. The marker detector device 120 only needs to be able to detect the marker member 110, and the attachment position is not limited thereto.

Figure 8:
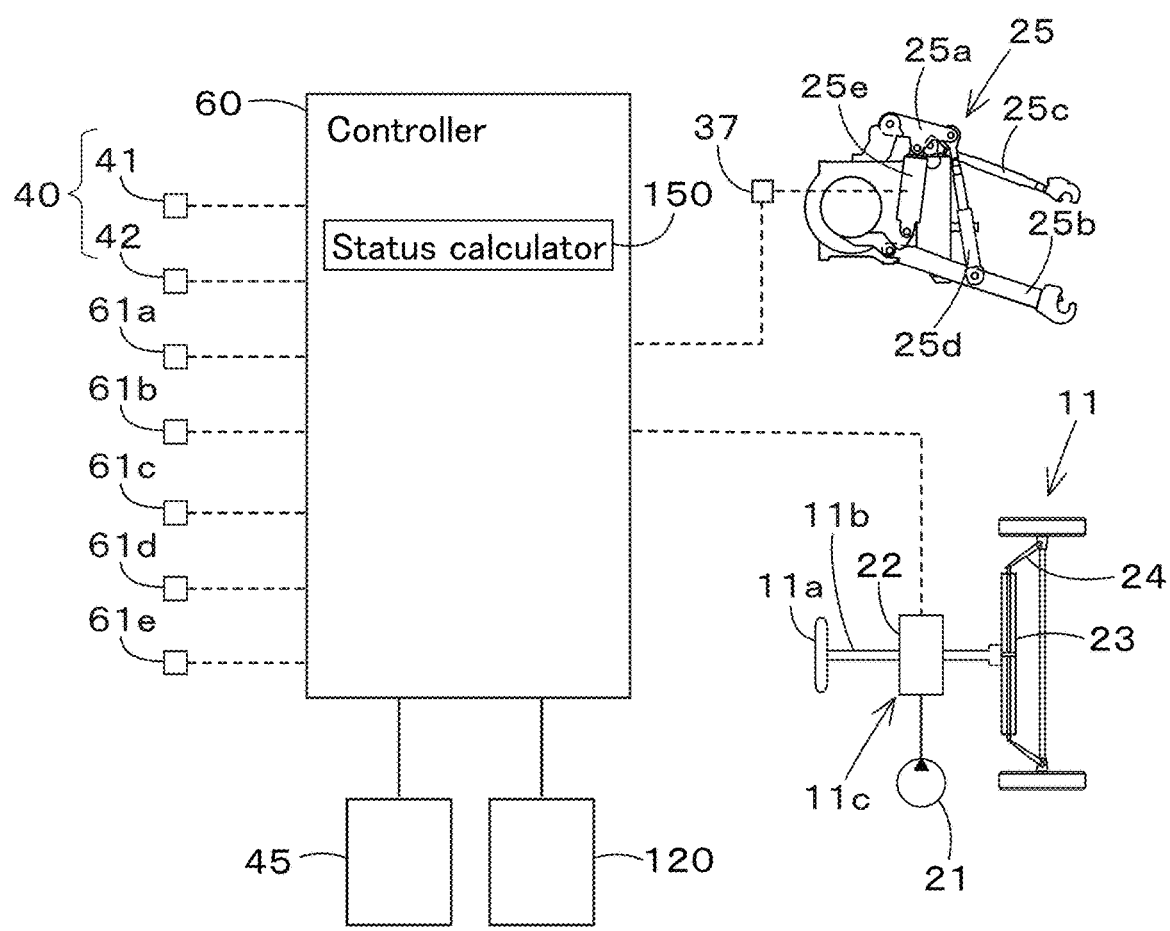
FIG. 8 is a control block diagram of a tractor.

As shown in FIG. 8, the tractor 1 is provided with a steering device 11. The steering device 11 includes a handle (steering wheel) 11a, a rotation shaft (steering shaft) 11b that rotates with the rotation of the handle 11a, and an assist mechanism (power steering mechanism) 11c that assists the steering of the handle 11a.

The assist mechanism 11c includes a hydraulic pump 21, a control valve 22 to which the hydraulic fluid discharged from the hydraulic pump 21 is supplied, and a steering cylinder 23 operated by the control valve 22. The control valve 22 is a solenoid valve that is activated based on a control signal.

The control valve 22 is a three-position switching valve that can be switched by movement of a spool or the like, for example. The control valve 22 can also be switched by steering the steering shaft 11B. The steering cylinder 23 is connected to an arm (knuckle arm) 24 that changes the direction of the front wheel 7F.

Thus, by operating the handle 11a, the switching position and opening of the control valve 22 is switched according to the handle 11a, and the steering direction of the front wheels 7F can be changed by stretching and shortening the steering cylinder 23 to the left or right according to the switching position and opening of the control valve 22. The steering device described above is an example and is not limited to the configuration described above.

The tractor 1 is provided with a positioning device 40. The positioning device 40 is configured to detect its own position (positioning information including latitude and longitude)

by a satellite positioning system (positioning satellites) such as D-GPS, GPS, GLONASS, HOKUTO, GALILEO, MICHIBIKI, and the like.

That is, the positioning device 40 receives satellite signals transmitted from the positioning satellite (such as the position of the satellite, transmission time, correction information, and the like) and detects the position (for example, latitude and longitude) of the tractor 1, that is, the vehicle position, based on the satellite signals.

The positioning device 40 includes a receiver device 41 and an inertial measurement unit (IMU: Inertial Measurement Unit) 42. The receiver device 41 includes an antenna and other devices to receive satellite signals transmitted from a positioning satellite and is attached to the traveling vehicle body 3 separately from the inertial measurement unit 42.

In this preferred embodiment, the receiver device 41 is mounted on the traveling vehicle body 3, that is, the cabin 9. The attachment portion of the receiver device 41 is not limited to that of the present preferred embodiment.

The inertial measurement device 42 includes an acceleration sensor to detect acceleration, a gyroscope to detect angular velocity, and the like. The traveling vehicle body 3, for example, is installed below the operator seat 10, and the roll angle, pitch angle, yaw angle, and the like of the traveling vehicle body 3 can be detected by the inertial measurement device 42.

In the above-mentioned preferred embodiment, the coupler portion 8 includes a swing drawbar, but it may also include a lifter device, as shown in FIG. 8. The case in which the coupler portion 8 includes a lifter device will be described. The coupler portion 8 includes a lift arm 25*a*, a lower link 25*b*, a top link 25*c*, a lift rod 25*d*, and a lift cylinder 25*e*.

The front end portion of the lift arm 25*a* is pivotally supported upward or downwardly on the upper rear portion of the case (transmission case) housing the speed-shifter device 5. The lift arm 25*a* is pivoted (lifted or lowered) by the driving of the lift cylinder 25*e*.

The lift cylinder 25*e* includes a hydraulic cylinder. The lift cylinder 25*e* is connected to a hydraulic pump via a control valve 37. The control valve 37 is a solenoid valve or the like, which stretches and shortens the lift cylinder 25*e*.

The front end portion of the lower link 25*b* is pivotally supported upwardly or downwardly on the rear bottom of the speed-shifter device 5. The front end portion of the top link 25*c* is pivotally supported upwardly or downwardly on the rear portion of the speed-shifter device 5 above the lower link 25*b*.

A lift rod 25*d* connects the lift arm 25*a* to the lower link 25*b*. A working device 2 is connected to the rear portion of the lower link 25*b* and the rear portion of the top link 25*c*.

When the lift cylinder 25*e* is driven (stretched), the lift arm 25*a* is lifted and lowered, as well as the lower link 25*b* connected to the lift arm 25*a* via the lift rod 25*d*.

This causes the working device 2 to pivot (lift or lower) upward or downward with the front of the lower link 25*b* as a fulcrum.

As shown in FIG. 8, the tractor is provided with a controller 60. The controller 60 performs various controls of the tractor. The controller 60 moves the traveling machine body 3 forward and backward based on the operation of the forward/backward traveling member 61*a*.

The controller 60 starts and stops the prime mover 4 based on operation of the ignition switch 61*b*. The controller 60 changes the gear shift (gear shift level) of the speed-shifter device 5 based on operation of the speed-shifter switching material 61*c*. The controller 60 changes the speed of the prime mover 4 (prime mover speed) based on the operation of the gas pedal 61*d*.

The controller 60, when the lifting operation member 61*e* is operated, stretches and shortens the lift cylinder 25*e* by controlling the control valve 37 to lift and lower the working device 2 via the lift arm 25*a*.

The controller 60 may control automatic traveling (automatic traveling control). In the automatic traveling in the controller 60, the traveling machine body 3 is automatically driven along a predetermined traveling route.

The controller 60 sets the switching position and opening of the control valve 22 so that at least the vehicle position of the traveling machine body 3 (the position detected by the positioning device 40) and the predetermined traveling route (the traveling route) match each other, that is, so that the traveling machine body 3 and the traveling route match each other.

In other words, when in the automatic traveling mode, the controller 60 sets the direction and amount of movement of the steering cylinder 23 (steering direction and steering angle of the front wheels) so that the travel position of the tractor coincides with the traveling route.

In detail, in the automatic traveling mode, the controller 60 compares the traveling position of the traveling vehicle body 3 with the position indicated by the traveling route (the scheduled traveling position), and when the traveling position and the scheduled traveling position are consistent each other, the steering angle and direction of the steering wheel 11*a* (the steering angle and direction of the front wheels) at the steering device 11 are held unchanged (the opening of the control valve 22 and the switching position of the control valve 22 are maintained unchanged).

The controller 60 changes the steering angle and/or steering direction of the steering wheel 11*a* at the steering device (changing the opening and/or switching position of the control valve 22) so that the deviation (amount of deviation) between the traveling position and the scheduled traveling position is zero when the traveling position and the scheduled traveling position do not match each other.

In the above-described preferred embodiment, the controller 60 changes the steering angle of the steering device 11 based on the deviation between the traveling position and the scheduled traveling position in the automatic traveling control, but when the orientation of the traveling route and the orientation (body orientation) of the traveling direction (driving direction) of the tractor (the traveling vehicle body 3) are different, the controller 60 may set the steering angle so that the body orientation matches the orientation of the traveling route.

The controller 60 may also set the final steering angle in automatic traveling control based on the steering angle obtained based on the deviation (position deviation) and the steering angle obtained based on the orientational deviation in automatic traveling control.

The steering angle may also be set in a different way than the method of setting the steering angle in the automatic traveling control described above.

The controller 60 may also control the number of revolutions of the traveling device 7 (that is, the front and/or rear wheels) so that the actual speed of the tractor (traveling machine body 3) matches the speed of the tractor (traveling machine body 3) corresponding to the predetermined traveling route in the automatic traveling control.

Although the controller 60 controls the steering of the traveling machine body 3 and the speed of the vehicle, the controller 60 performs the automatic traveling by controlling the steering of the traveling machine body 3, it is not limited to the automatic traveling control, although auto-steer control (the automatic steering control), which allows the driver to adjust the vehicle speed, may be performed. Also, as a matter of course, it is possible to perform the manual traveling in which the operator manually operates the tractor.

As shown in FIG. 8, the tractor 1 is provided with a status calculator device 150. The status calculator device 150 includes, for example, electrical and electronic circuits and programs provided in the controller 60. The status calculator device 150 is not limited to a program stored in a display device 45 in the tractor 1 or in a mobile terminal 151 of a smartphone, tablet or PDA.

The status calculator device 150 calculates the status of the working device 2 based on the detection data detected by the marker detector device 120, for example, the captured image, and the like. For example, the status calculator device 150 determines the position of the working device 2 as the status of the working device 2, that is, the position of the marker member 110 (first marker member 110L, second marker member 110R) as the status of the working device 2.

As shown in FIG. 6, the status calculator device 150 determines the position ML (X1, Y1, Z1) of the first marker member 110L based on the image captured by the camera, when the marker detector device 120 is a camera (a visible light camera such as CCD, CMOS, and the like). The status calculator device 150 also finds the position MR (X2, Y2, Z2) of the second marker member 110R based on the captured image captured by the camera.

In particular, the status calculator device 150 acquires a captured image from the marker detector device 120 and recognizes the first marker member 110L from the shape reflected in the captured image. When the status calculator device 150 recognizes the first marker member 110L, the status calculator device 150 obtains the areas S11, S12, S13, S21, S22, S23, S31, S32, and S33 of the first marker member 110L within a predetermined frame of the first marker member 110L (within the frame in the captured image). The status calculator device 150 also determines the orientation ML (r11, r12, r13, r21, r22, r23, r31, r32, r33) of the first marker member 110L (r11, r12, r13, r21, r22, r23, r31, r32, r33) based on the areas S11, S12, S13, S21, S22, S23, S31, S32, and S33 of each other, that is, a posture in the triaxial direction (X-axis, Y-axis, Z-axis) is obtained.

For example, when the areas S11, S12, S13, S21, S22, S23, S31, S32, and S33 of the first marker member 110L are the same, then the status calculator device 150 is the same as the three axes of the reference (X-, Y-, and Z-axes).

The status calculator device 150 also determines the position ML (X1, Y1, Z1) of the first marker member 110L from the focal distance (subject distance) from the marker detector device 120 to the first marker member 110L and the position ML of the first marker member 110L.

When the status calculator device 150 recognizes the second marker member 110R, the status calculator device 150 determines the areas S41, S42, S43, S51, S52, S53, S61, S62, and S63 of the second marker member 110R within a preset frame of the second marker member 110R (within the frame in the captured image). The status calculator device 150 also determines the posture RR (r41, r42, r43, r51, r52, r53, r61, r62, r63) RL of the second marker member 110R from each other's areas S41, S42, S43, S51, S52, S53, S61, S62, S63, and S63, that is, a posture in the triaxial direction (X-axis, Y-axis, Z-axis) is obtained.

For example, when the areas S41, S42, S43, S51, S52, S53, S61, S62, and S63 of the second marker member 110R are the same, then the status calculator device 150 will be the same as the three axes of the reference (X, Y, and Z axes) and not tilted.

The status calculator device 150 also determines the position MR (X2, Y2, Z2) of the second marker member 110R from the focal distance (subject distance) from the marker detector device 120 to the second marker member 110R and the posture RR of the second marker member 110R.

As shown in FIG. 6, with the tractor 1 (working device 2) stopped, the X direction is a front-to-rear direction (a direction of traveling), the Y direction is a left-to-right direction (a direction of width), and the Z direction is a height direction (a vertical direction).

As described above, the status calculator device 150 can find the position ML (X1, Y1, Z1) of the first marker member 110L and the position MR (X2, Y2, Z2) of the second marker member 110R. That is, the status calculator device 150 can find the position ML (X1, Y1, Z1) of the upper left side and the position MR (X2, Y2, Z2) of the upper right side at the working device 2.

Figure 7A:
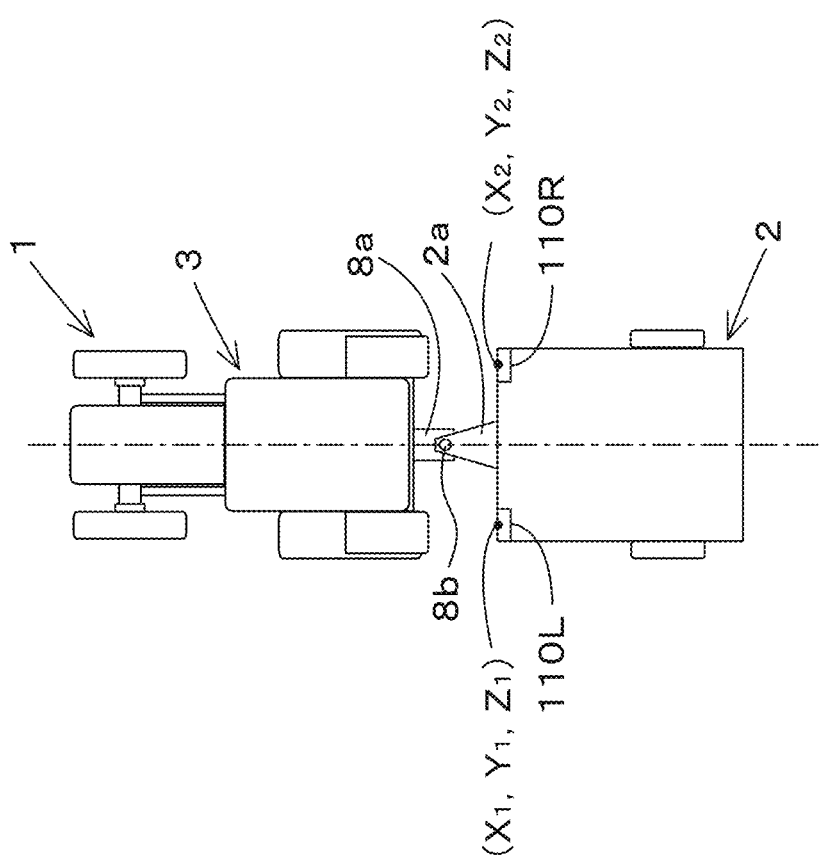
FIG. 7A is a view illustrating a state where a working device has a straight posture with respect to a traveling body.
Figure 7B:
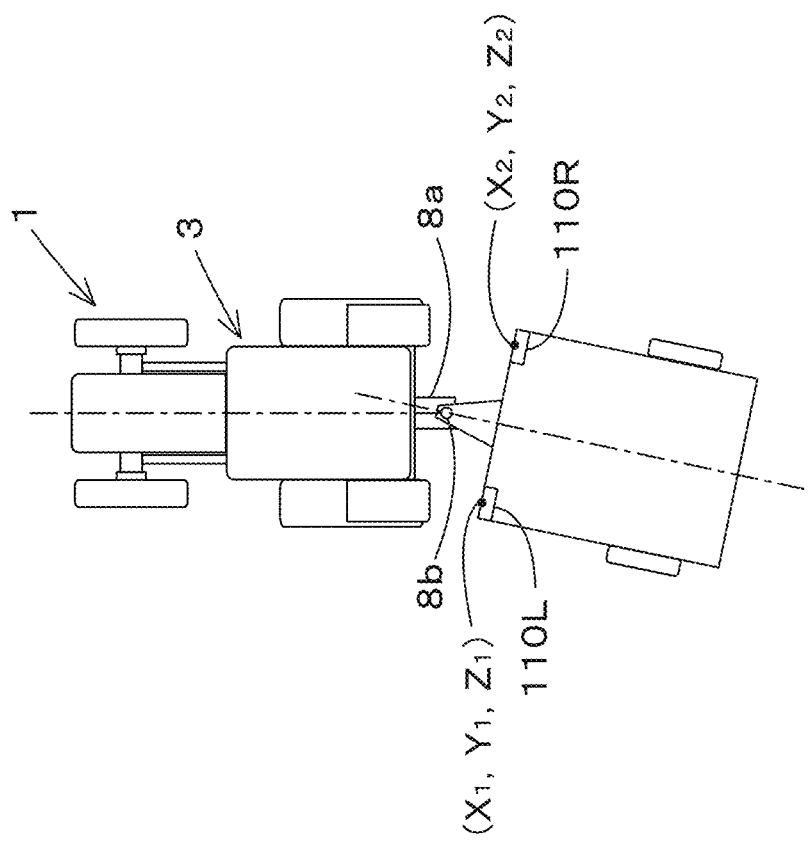
FIG. 7B is a view illustrating a state where a working device has an oblique posture with respect to a traveling body.

According to this configuration, the positions ML and MR of the front of the working device 2 can be determined in three dimensions in a situation where the agricultural work is being performed while towing the working device 2 with the tractor 1, as shown in FIGS. 7A and 7B.

As shown in FIG. 7A, when the status calculator device 150 finds the upper left position ML (X1, Y1, Z1) and the upper right position MR (X2, Y2, Z2) of the working device 2, when the position X1 and the position X2 are the same, the working device 2 is traveling without inclining in the front-to-rear direction.

As shown in FIG. 7B, when the status calculator device 150 finds the upper left position ML (X1, Y1, Z1) and the upper right position MR (X2, Y2, Z2) of the working device 2, when at least position X1 is ahead of the position X2, the working device 2 is traveling ahead of the left side of the traveling machine body 3.

When the status calculator device 150 finds the upper left position ML (X1, Y1, Z1) and the upper right position MR (X2, Y2, Z2) of the working device 2, when at least position X2 is ahead of position X1, the working device 2 is traveling ahead of the traveling machine body 3 on the right side.

The status calculator device 150 may calculate the relative position of the traveling machine body 3 and the working device 2 as the status of the working device 2. When the display device 45 or the mobile terminal 151 is operated in a predetermined manner, the status calculator device 150 displays a setting screen M1 on the display device 45 or the mobile terminal 151. The setting screen M1 displays a graphic D1 that represents the tractor 1 and a graphic D2 that represents the working device 2.

The setting screen M1 also includes an input portion 141 in the X direction and an input portion 142 in the Y direction. The input portion 141 is capable of inputting the front-to-rear direction (a distance in the X direction) X10 from the positioning device 40 to the marker detector device 120.

The input portion 142 is capable of inputting the width direction (a distance in the Y direction) Y10 from the positioning device 40 to the marker detector device 120. For example, when the marker detector device 120 is offset to the left or right with respect to the positioning device 40, the amount of offset (the distance in the Y direction) is input to the input portion 142.

Thus, when the distance X10 in the X direction and the distance in the width direction (distance in the Y direction) Y10 are entered into the input portions 141 and 142, the positioning device 40 can obtain the position (latitude and longitude) of the marker detector device 120 by adding or subtracting the latitude and longitude corresponding to the distance X10 in the X direction and the distance in the width direction (distance in the Y direction) Y10 to the vehicle position (first position) detected by the positioning device 40.

The status calculator device 150 obtains the second position, which is the position of the marker detector device 120, while also obtaining the positions ML and MR of the front of the working device 2, as described above.

Here, the status calculator device 150 can obtain the first device position (device position) converted to latitude and longitude by converting the position of the first marker member 110L (front position ML of the working device 2) into latitude and longitude based on the focal distance (subject distance) from the marker detector device 120 to the first marker member 110L and the position of the first marker member 110L (front position ML of the working device 2).

In addition, the status calculator device 150 can obtain the second device position (device position) by converting the position of the second marker member 110R (the front position MR of the working device 2) into latitude and longitude based on the focal distance (subject distance) from the marker detector device 120 to the second marker member 110R and the position of the second marker member 110R (the front position MR of the working device 2), and then converting the front position MR of the working device 2 into latitude and longitude.

In other words, the first position of the positioning device 40 and the second position of the marker detector device 120 can be used to determine the device position (first device position, second device position) of the front of the working device 2 on the ground (in the field).

The device position (first device position, second device position) and the second position of the marker detector device 120 allow for determination the relative positions of the traveling machine body 3 and the working device 2 to each other.

Now, taking the working device 2 other than the trailer as an example, the position and orientation of working device 2 will also be explained.

Figure 9A:
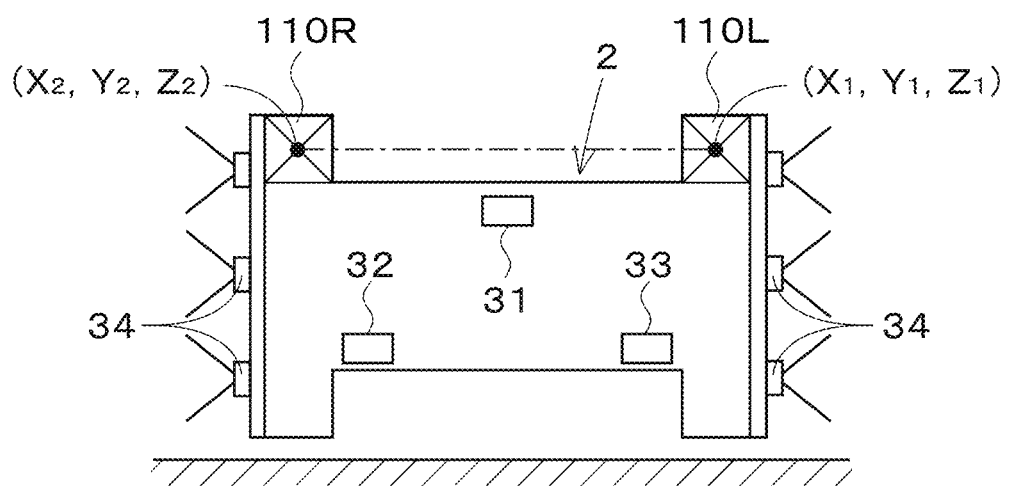
FIG. 9A is a view illustrating a state where a working device has a parallel posture with respect to a traveling body.
Figure 9B:
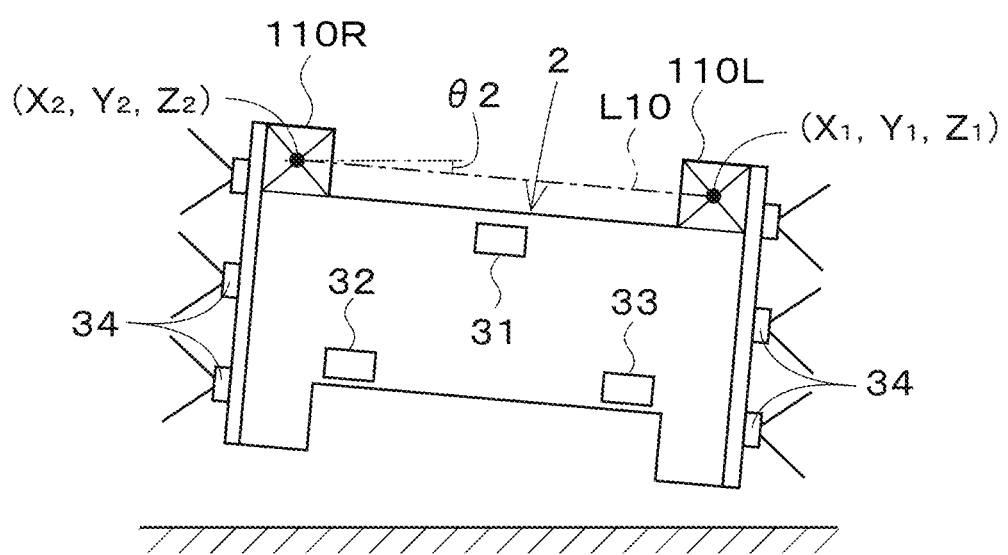
FIG. 9B is a view illustrating a state where a working device has a posture inclining rightward with respect to a traveling body.
Figure 9C:
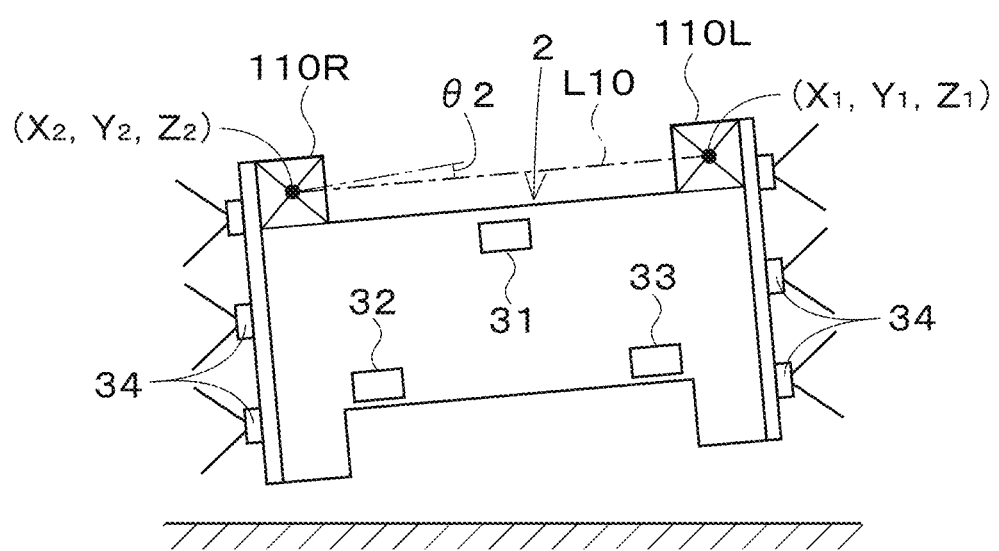
FIG. 9C is a view illustrating a state where a working device has a posture inclining leftward with respect to a traveling body.

The working device 2 shown in FIGS. 9A to 9C is a working device that can be connected to a lifter device, for example, an example of a sprayer device. The working device 2 includes a first connector portion 31 connected to the top link 25c of the lifter device and a connector portions 32 and 33 connected to the lower link 25b.

The left and right portions of the working device 2 are provided with sprayer nozzles 34 to spray fertilizer, chemicals, and the like. The sprayer nozzle 34 is connected to a piping, which is omitted in the drawings, and can spray the spraying material (fertilizer, chemicals) presented in the piping by a pump or other means.

As shown in FIG. 9A, when the status calculator device 150 finds the upper left position ML (X1, Y1, Z1) and the upper right position MR (X2, Y2, Z2) of the working device 2, the working device 2 is horizontal with respect to the ground (field) if the vertical direction Z1 and Z2 are the same.

As shown in FIG. 9B, when the status calculator device 150 finds the upper left position ML (X1, Y1, Z1) and the upper right position MR (X2, Y2, Z2) of the working device 2, the working device 2 is tilted by an angle θ2 and is upright if the vertical Z2 is higher than Z1.

As shown in FIG. 9C, when the status calculator device 150 finds the upper left position ML (X1, Y1, Z1) and the upper right position MR (X2, Y2, Z2) of the working device 2, the working device 2 is tilted by an angle θ3 and is left up if the vertical Z1 is higher than Z2.

As described above, the position and posture can be obtained by the status calculator device 150, and the roll angle, pitch angle, and yaw angle of the working device 2 and the position of the working device 2 with respect to the traveling machine body 3 can be obtained. The state (position and posture) of the status calculator device 150 may be displayed on a display device 45 or the like. The tractor 1 may also be controlled by the controller 60 according to the state (position and posture) of the status calculator device 150.

The working vehicle 1 includes the traveling machine body 3 including the coupler portion 8 connecting the working device 2, the marker member 110 on the working device 2, the marker detector device 120 on the traveling machine body 3 that detects the marker member 110, and the status calculator device 150 that calculates the status of the working device 2 based on the detection data detected by the marker detector device 120.

According to this configuration, by providing the marker member 110 on the working device 2, the position, posture, and the like of the working device 2 can be easily ascertained.

The status calculator device 150 calculates the position of the working device 2 as the status of the working device 2. According to this configuration, the position of the working device 2 can be easily ascertained, and when farming in a field or in an orchard, the position of the working device 2 can be ascertained without a positioning device that detects its position based on signals from a positioning satellite on the working device 2.

In addition, even when a positioning device is installed in the working device 2, the position can be determined instead of the positioning device even when the receiving intensity of the positioning satellite signal is low.

The status calculator device 150 calculates the posture of the working device 2 as the status of the working device 2. According to this configuration, it is possible to ascertain the posture of the working device 2 in three directions (roll angle, pitch angle, and yaw angle).

The status calculator device 150 calculates the relative positions of the traveling vehicle body 3 and the working device 2 as the status of the working device 2. This allows the user to determine how far away the working device 2 is from the traveling vehicle body 3, for example, during the operation. In other words, it is possible to ascertain the degree to which the working device 2 is in proximity to or away from the traveling vehicle body 3.

The working vehicle 1 is provided with the positioning device 40, wherein the traveling machine body 3 is the position of the traveling machine body 3, and the status calculator device 150 calculates the equipment position, which is the position of the working device 2, based on the vehicle position calculated at the detected position and on the status of the working device 2.

According to this configuration, the latitude and longitude can be determined using the vehicle body position calculated by the positioning device.

The marker detector device 120 is an imaging device that captures the marker member 110. According to this configuration, the status of the working device 2 can be easily determined.

The traveling management system of the working vehicle 1 is provided with the marker member 110 on the working device 2 connected to the traveling vehicle 3, the marker detector device 120 on the traveling vehicle 3 that detects the marker member 110, and the status calculator device 150 that calculates the status of the working device 2 based on the detection data detected by the marker detector device 120.

According to this configuration, by providing the marker member 110 on the working device 2, the position, posture, and the like of the working device 2 can be easily ascertained.

The traveling management system for the working vehicle 1 is provided with the positioning device that measures the vehicle position, which is the position of the traveling vehicle body 3, and the status calculator device 150 calculates the vehicle position, which is the position of the working device 2, based on the vehicle position calculated at the detected position and the status of the working device 2.

According to this configuration, it is possible to know how far away the working device 2 is from the traveling machine body 3, for example, during the work.

In other words, the degree to which the working device 2 is in proximity to or away from the traveling machine body 3 can be ascertained.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
   a traveling body including a coupler to which a working device is connected;
   a first marker and a second marker attached to the working device, the first marker and the second marker being identifiable as different markers from each other;
   a marker detector provided to the traveling body to detect the first marker and the second marker; and
   a status calculator to determine a position of the first marker in three dimensions and a position of the second marker in three dimensions based on detection data detected by the marker detector and calculate a posture and a position of the working device from the position of the first marker in three dimensions and the position of the second marker in three dimensions.

2. The working vehicle according to claim 1, wherein the status calculator calculates a relative position between the traveling body and the working device.

3. The working vehicle according to claim 1, wherein
   the traveling body includes a position detector to obtain a vehicle position that is a position of the traveling body; and
   the status calculator determines a latitude and a longitude of a position at which the working device is located based on the vehicle position obtained by the position detector and the position of the working device.

4. The working vehicle according to claim 1, wherein
   the first marker and the second marker are identifiable as visually different markers from each other;
   the marker detector includes an imager to image the first marker and the second marker; and
   the status calculator determines the position of the first marker in three dimensions and the position of the second marker in three dimensions based on an image captured by the imager.

5. The working vehicle according to claim 1, wherein
   the first marker and the second marker each include a frame and lines located in the frame; and
   the first marker is colored with a first color in the frame, the second marker is colored with a second color in the frame, and the second color is different from the first color.

6. The working vehicle according to claim 1, wherein
   the working device is connected to a rear portion of the traveling body by the coupler;
   the first marker is attached to an upper left-hand corner of a frame on a front surface of the working device; and
   the second marker is attached to an upper right-hand corner of the frame.

7. The working vehicle according to claim 1, wherein
   the marker detector includes an imager to image the first marker and the second marker; and
   the status calculator is configured or programmed to:
   acquire a captured image from the marker detector;
   obtain areas of predetermined portions in a frame of the first marker recognized from the captured image, determine a posture of the first marker from the areas of the predetermined portions, and determine the position of the first marker in three dimensions from the posture of the first marker and a focal distance from the marker detector to the first marker;
   obtain areas of predetermined portions in a frame of the second marker recognized from the captured image, determine a posture of the second marker from the areas of the predetermined portions, and determine the position of the second marker in three dimensions from the posture of the second marker and a focal distance from the marker detector to the second marker; and
   calculate the posture and the position of the working device in three dimensions from the position of the first marker in three dimensions and the position of the second marker in three dimensions.

8. A traveling management system for a working vehicle, the traveling management system comprising:
   a first marker and a second marker attached to a working device, the first marker and the second marker being identifiable as different markers from each other;
   a marker detector provided to a traveling body of the working vehicle to detect the first marker and the second marker, the traveling body including a coupler to connect the working device to the traveling body; and
   a status calculator to determine a position of the first marker in three dimensions and a position of the second marker in three dimensions based on detection data detected by the marker detector and calculate a posture and a position of the working device from the position of the first marker in three dimensions and the position of the second marker in three dimensions.

9. The traveling management system according to claim 8, wherein the status calculator calculates a relative position between the traveling body and the working device.

10. The traveling management system according to claim 8, further comprising:
    a position detector to obtain a vehicle position that is a position of the traveling body; wherein the status calculator determines a latitude and a longitude of a position at which the working device is located based on the vehicle position obtained by the position detector and the position of the working device.

11. The traveling management system according to claim 8, wherein
the first marker and the second marker are identifiable as visually different markers from each other;
the marker detector includes an imager to image the first marker and the second marker; and
the status calculator determines the position of the first marker in three dimensions and the position of the second marker in three dimensions based on an image captured by the imager.

12. The traveling management system according to claim 8, wherein
the first marker and the second marker each include a frame and lines located in the frame; and
the first marker is colored with a first color in the frame, the second marker member is colored with a second color in the frame, and the second color is different from the first color.

13. The traveling management system according to claim 8, wherein
the working device is connected to a rear portion of the traveling body by the coupler;
the first marker is attached to an upper left-hand corner of a frame on a front surface of the working device; and
the second marker is attached to an upper right-hand corner of the frame.

14. The traveling management system according to claim 8, wherein
the marker detector includes an imager to image the first marker and the second marker; and
the status calculator is configured or programmed to:
acquire a captured image from the marker detector;
obtain areas of predetermined portions in a frame of the first marker recognized from the captured image, determine a posture of the first marker from the areas of the predetermined portions, and determine the position of the first marker in three dimensions from the posture of the first marker and a focal distance from the marker detector to the first marker;
obtain areas of predetermined portions in a frame of the second marker recognized from the captured image, determine a posture of the second marker from the areas of the predetermined portions, and determine the position of the second marker in three dimensions from the posture of the second marker and a focal distance from the marker detector to the second marker; and
calculate the posture and the position of the working device in three dimensions from the position of the first marker in three dimensions and the position of the second marker in three dimensions.

15. A method for determining a status of a working device connected to a coupler of a traveling body of a working vehicle, the method comprising:
attaching a first marker and a second marker to the working device, the first marker and the second marker being identifiable as different markers from each other;
causing a marker detector provided to the traveling body to detect the first marker and the second marker;
causing a status calculator to determine a position of the first marker in three dimensions and a position of the second marker in three dimensions based on detection data detected by the marker detector; and
causing the status calculator to calculate a posture and a position of the working device from the position of the first marker in three dimensions and the position of the second marker in three dimensions.

16. The method according to claim 15, further comprising:
forming lines in a frame of the first marker and lines in a frame of the second marker; and
coloring the first marker with a first color in the frame and the second marker with a second color in the frame, the second color differing from the first color.

17. The method according to claim 15, further comprising:
attaching the first marker to an upper left-hand corner of a frame on a front surface of the working device and the second marker to an upper right-hand corner of the frame.

18. The method according to claim 15, further comprising:
causing the marker detector including an imager to image the first marker and the second marker;
causing the status calculator to obtain areas of predetermined portions in a frame of the first marker recognized from a captured image captured by the marker detector, determine a posture of the first marker from the areas of the predetermined portions, and determine the position of the first marker in three dimensions from the posture of the first marker and a focal distance from the marker detector to the first marker;
causing the status calculator to obtain areas of predetermined portions in a frame of the second marker recognized from the captured image, determine a posture of the second marker from the areas of the predetermined portions, and determine the position of the second marker in three dimensions from the posture of the second marker and a focal distance from the marker detector to the second marker; and
causing the status calculator to calculate the posture and the position of the working device in three dimensions from the position of the first marker in three dimensions and the position of the second marker in three dimensions.

* * * * *